(12) United States Patent
Sharify

(10) Patent No.: US 6,325,389 B1
(45) Date of Patent: Dec. 4, 2001

(54) SELF SEALING FLUID DUCT/FITTING CONNECTOR

(76) Inventor: Amir Sharify, 17W160 Monterey Ave., Oakbrook Terrace, IL (US) 60181

( * ) Notice: Subject to any disclaimer, the term of this patent is extended or adjusted under 35 U.S.C. 154(b) by 0 days.

(21) Appl. No.: 09/426,575

(22) Filed: Oct. 25, 1999

(51) Int. Cl.[7] ................................... F16L 21/025
(52) U.S. Cl. ............... 277/604; 277/606; 277/616; 277/910; 285/344
(58) Field of Search .................. 285/344, 347; 277/604, 605, 606, 616, 625, 626, 910

(56) References Cited

U.S. PATENT DOCUMENTS

| | | | | |
|---|---|---|---|---|
| 1,502,673 | * | 7/1924 | Hole | 285/344 X |
| 2,094,629 | * | 10/1937 | Whittam | 285/344 X |
| 3,165,324 | * | 1/1965 | Zopfi | 277/625 X |
| 4,132,415 | * | 1/1979 | Langford | 277/625 X |
| 4,993,756 | * | 2/1991 | Bechu | 285/344 X |

* cited by examiner

*Primary Examiner*—Robert J. Sandy
*Assistant Examiner*—Karlena D. Schwing

(74) *Attorney, Agent, or Firm*—James P. Hillman

(57) ABSTRACT

A unique fluid pipe/duct coupling/fitting having flexible arcuate pliable and deformable gaskets such as an O-ring providing the seal between an OD pipe and the ID coupling or fitting and an uncouple retard structure for promoting the insertion of the tubular fluid connector from backing away or withdrawing from the fluid pipe into which the ID coupling is being inserted. The uncoupling retarder structure includes a first starting groove and a last or final resting groove both disposed on the tubular wall of the fluid connector pipe, the first beginning and last final resting groove being disposed and having a predetermined longitudinal distance along the length of the pipe wall between them. This longitudinal distance between the first or initial position groove and the last or final position groove has disposed on the predetermined distance between them a series of discreet ramps extending from the depth of the first or initial position starting groove and extending in ever increasing radial steps away from the axis of the connector pipe up to the radial position at the top of the final or resting position groove. Each of these ramps or steps has a predetermined length and radial rise so as to produce a stepped incline from the radial position of the first or initial groove up to the top of the final or resting position groove.

7 Claims, 8 Drawing Sheets

SELF SEALING FLUID DUCT/FITTING CONNECTOR

BACKGROUND OF THE INVENTION

1. Field of the Invention

The invention relates in general to fluid pipe systems such as air ducts and their fittings for HVAC (heating; ventilation; and air-conditioning) systems, and in particular to a fluid pipe connector for connecting with one or more fluid pipes, and sealing the connection by means of a moving rubber gasket seal.

2. Description of the Relevant Art

Conventional HVAC ventilation duct systems are composed of elongated straight ducts and a large number of individual or sometimes grouped fittings such as for instance elbows, bends, T pieces, transitions, etc. At different positions along the longitudinal length or at the junction with one of these specific fittings it is necessary to provide a seal. The problem of achieving a seal between two pipes has long been addressed by those skilled in the art. U.S. Pat. Nos. 5,531, 460; 5,473,815; European Patent EP 0 596 230; Data Sheet 6121 featuring ROLL-GU-FIX, a registered trademark of Aerotechnik Siegwart GMBH; and Design Pat. Nos. 363, 115; 377,829; 386,246; 362,300 and 362,299 and others all depict the use of a flexible deformable type gasket material disposed between an outer and inner fluid pipe junction. All of the above patents of the related art are suitable for their intended purpose, that is to make a seal, and their intended methods of adjoining the pipes.

U.S. Pat. Nos. 4,050,703 and 5,531,460 and several of the Design Patents all assigned to Lindab Ab Basted Sweden are directed to pipe connectors for establishing a connection between pipes wherein lip seal of U-shaped cross-section provides a seal between the outer side of the connector and the inner side of the pipe. U.S. Pat. No. 5,531,460 appears to be an improvement invention wherein the U-shaped cross-section sealing ring is pre-loaded by first providing an arcuate section for the middle of the U so that the side member flanges are first directed ideally outward and then brought to a 90 degree position of the U when the arcuate middle section is clamped.

European Patent EP 0 596 230 B1 and Specification Sheet 6121 directed to ROLL-GU-FIX, the registered trademark of Aerotechnik Siegwart GMBH are both directed to a rolling flexible gasket that starts from a first initial position or groove on the coupler and then as the coupler is passed into the pipe/duct rolls to a second or final resting position or groove as the pipes ducts are completely inserted, i.e. when the connector is completely inserted into the pipe/duct.

An important element of HVAC fluid pipe/duct assemblies that is not addressed by any of these examples of assembly of the related art is that although these sealing methods may provide a greater or lesser seal, they do not tend to affix the pipes/ducts together but rather require an attachment method to make the final connection between two pipes/ducts of the junction. They will not even make a temporary attachment. Sometimes in the assembly of large pipe/duct runs, the large volume pipes/ducts (which can be quite massive), will not retain themselves in position until that attachment means has been completed which is often by the use of one or more sheet metal screws. This can be unweilding, undesirable and unwelcome to skilled laborers/craftsmen/technicians who are assembling the pipe/duct runs. None of these patents of the related art shows or even hints at a way to at least temporarily stop the pipes/ducts from being pulled apart during or after when they are or have been inserted.

Accordingly, it would be desirable to have a pipe/duct juncture featuring a flexible deformable gasket material that will at least temporarily keep its position during the assembly process before the permanent attachment means is affixed. It would be further desirable to have a pipe/duct juncture featuring a flexible deformable gasket material that will permanently keep its position after the assembly process thereby eliminating the permanent attachment means.

SUMMARY OF THE INVENTION

Briefly, the present invention is a unique fluid pipe/duct coupling/fitting having flexible arcuate pliable and deformable gaskets such as an O-ring providing the seal between an OD pipe and the ID coupling or fitting and an uncouple retard means for promoting the insertion of the tubular fluid connector into a fluid pipe and preventing/retarding the tubular fluid connector from backing away or withdrawing from the fluid pipe into which the ID coupling is being inserted. The uncoupling retarder means includes a first starting groove and a last or final resting groove both disposed on the tubular wall of the fluid connector pipe, said first beginning and last final resting groove being disposed and having a predetermined longitudinal distance along the length of the pipe wall between them. This longitudinal distance between the first or initial position groove and the last or final position groove has disposed on the predetermined distance between them a series of discreet ramps extending from the depth of the first or initial position starting groove and extending in ever increasing radial steps away from the axis of the connector pipe up to the radial position at the top of the final or resting position groove. Each of these ramps or steps has a predetermined length and radial rise so as to produce a stepped incline from the radial position of the first or initial groove up to the top of the final or resting position groove. Any number of ramps can be used but a preferred embodiment of the invention utilizes five ramps. The purpose of each ramp is to prevent rollback of the annular flexible sealing material so as to prevent/retard uncoupling of the longitudinal run of pipe and the connector once the connector is inserted into the longitudinal run of pipe. Each discreet ramp presents a longitudinal shallow-sloped run for the annular flexible gasket sealer to roll up for the insertion direction of the coupling and presents a saw-tooth rigid vertical resting place for the annular flexible sealing material to bind against in the opposite withdrawal direction, so as to retard/prevent withdrawal of the coupling midway between the beginning of the insertion and the final resting spot. A preferred embodiment of the invention utilizes a large cross-sectional area annular flexible sealing means such that when said annular sealing means is rolling up the stepped surfaces during the insertion of the coupling into the longitudinal run of pipe, then the large cross-sectional area sealing means becomes compressed. The size of compression of the large cross-sectional area sealing means is predetermined so as to extend over at least two of the vertical ramp ridges so as to insure the annular flexible sealing means retards/prevents movement of the coupler in the withdrawal direction. The enlarged cross-sectional area of flexible annular sealing means as disclosed above may take the form of a predetermined oversized annular O-ring of standard or custom made specifications. The flexible annular sealing means may take other geometric configurations as well, such as for example an elliptical, oblong or even square cross section.

An alternate embodiment of the invention comprises grooves having the mirror image geometry of the fitting grooves disposed on the tube wall of the end of the longitudinal duct run such that when the end of the duct run is pushed over a standard non-grooved duct fitting a flexible annular deformable gasket material such as an O-ring will deform between the tube walls of the duct fitting and the duct run. Alternate O-ring geometries again include oblong, egg-shaped, elliptical, and even square and rectangular cross-sections. Alternate adhesion means for ensuring that the O-rings remain disposed between the fitting and the end of the duct run include embedding a wire, band or other form retaining substance within the cross-section of the O-ring and disposing adhesive material on either the grooved surfaces of the fitting and/or the duct/pipe/tube wall of the longitudinal duct run groove geometries.

BRIEF DESCRIPTION OF THE DRAWINGS

The invention may be understood and further advantages and uses thereof more readily apparent, when considered in view of the following detailed description of the exemplary embodiments, taken with the accompanying drawings, in which.

DESCRIPTION OF THE PREFERRED EMBODIMENTS

Figure 1:
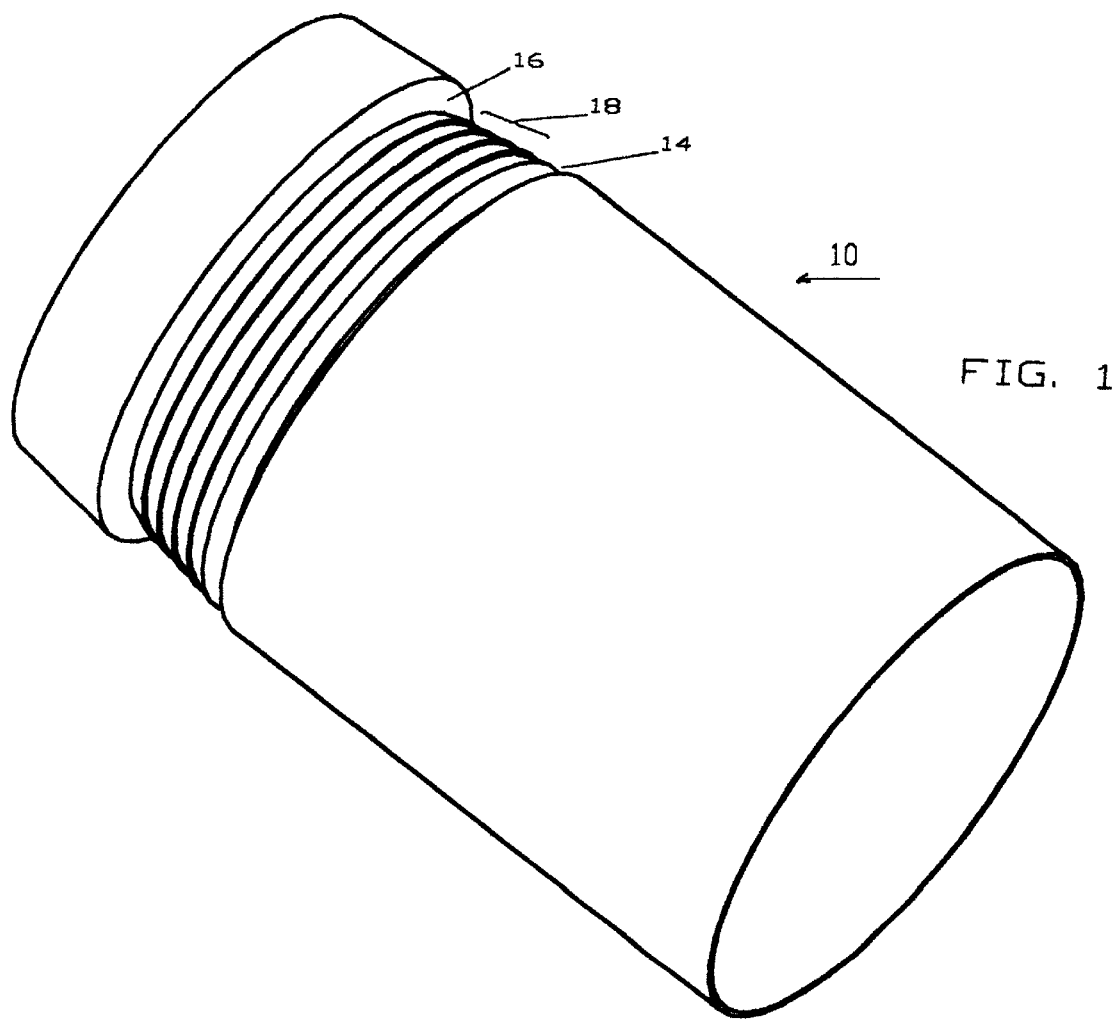
FIG. 1 is an isometric view of the SELF SEALING FLUID DUCT/FITTING CONNECTOR constructed according to the teachings of the invention.

Referring now to FIG. 1 there is shown a coupling 10 constructed according to the teachings of the invention which may be the insertion portion of a coupling of the discreet components of fluid duct work for HVAC systems such as for instance transitions, elbows, straight couplers, etc. Coupling 10 includes initial starting position groove 14, final or resting position groove 16 and intermediate succession of multiple ramps grooves 18 extending between first position 14 and last or final position 16. Note that final position groove 16 is disposed at approximately the same radial depth as starting position groove 14 for final assembly stability. This teaching of the invention is better understood with reference to FIGS. 2 and 3.

Figure 2:
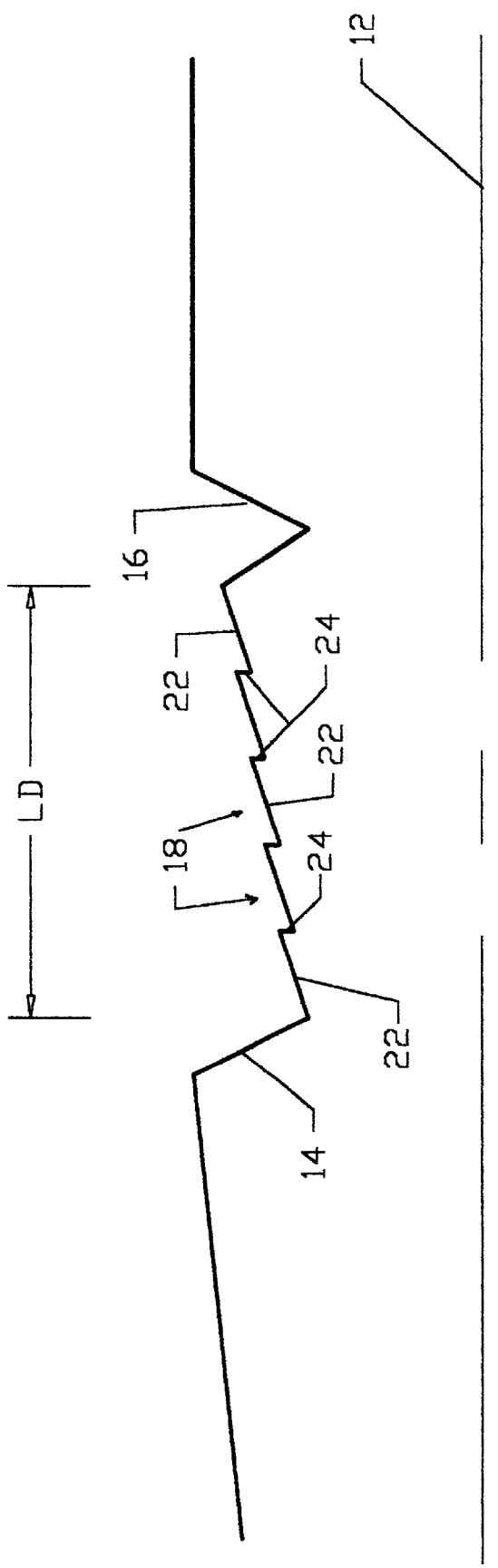
FIG. 2 is a schematic cross-sectional view of one side of the tube wall of the tube/pipe/duct fitting of FIG. 1 constructed according to the teachings of the invention.

Referring now to FIG. 2 there is shown an enlarged cross-sectional view of one wall of the fluid pipe/duct connector of FIG. 1 constructed according to the invention. As illustrated in FIG. 2 there is shown running the predetermined longitudinal distance LD between initial or starting groove 14 and final terminal groove 16, a series of longitudinal grooved steps 18 having increasing radial distance from the axis 12 of connector 10 including sloped portions 22 and vertical step portions 24. The purpose of the multiplicity of steps 18 are to compress a radial sealing gasket such as a flexible O-ring which is rolled up the inclined slopes 22 so as to flatten it against one or more vertical step portions 24 to prevent back roll and retard/prevent withdrawal movement of coupling 10 from longitudinal pipeline 12.

Figure 2A:
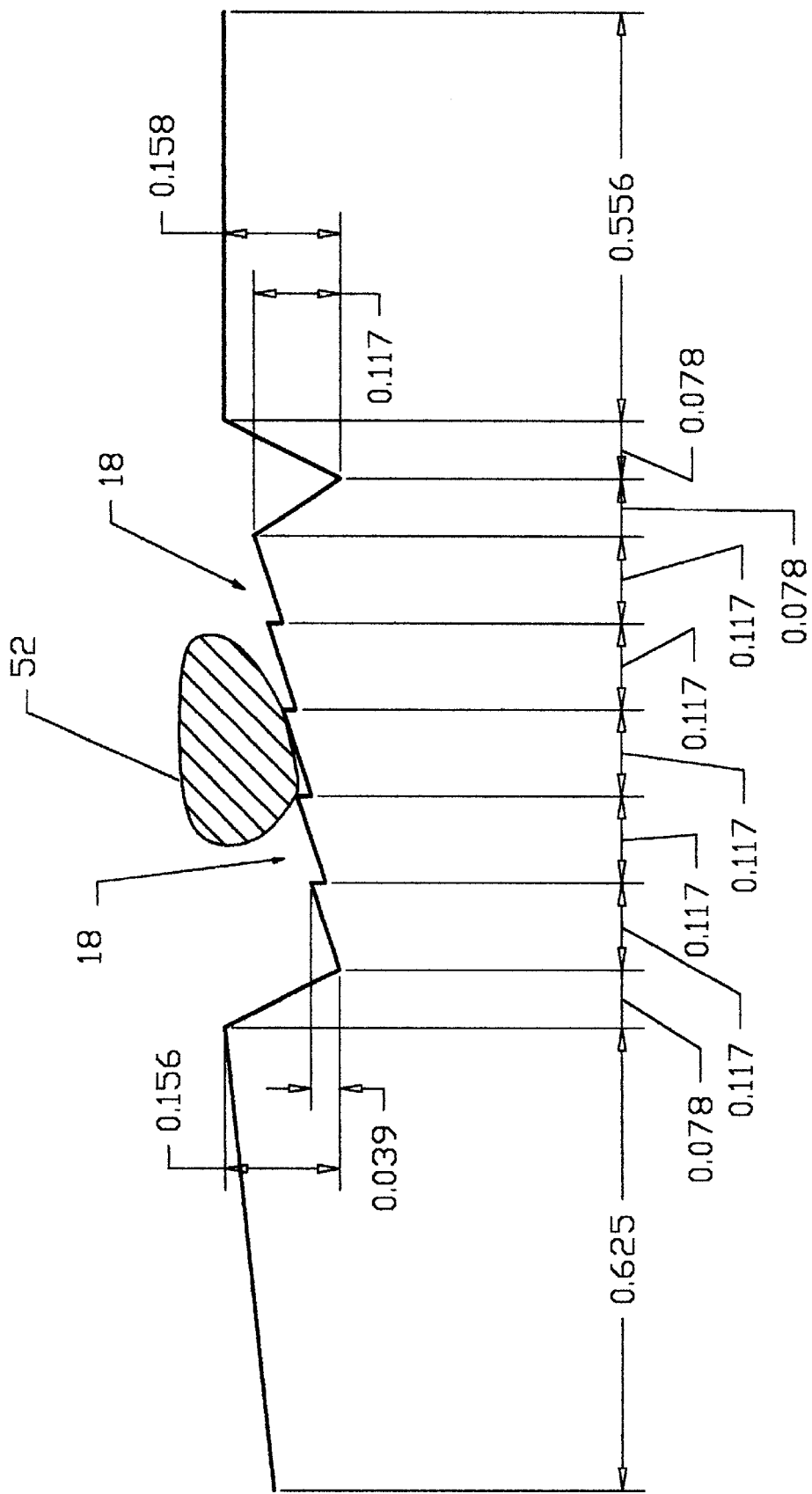
FIG. 2A is the schematic cross-sectional view of one side of the tube wall of the tube/pipe/duct fitting of FIG. 2 with distance specifications attached.

Referring now to FIG. 2A there is shown another cross-sectional view of coupling 10 this time having dimensional distances applied to the longitudinal steps 18. The teachings of the invention are of course not limited to such dimension but these are illustrations of one preferred embodiment.

Figure 2B:
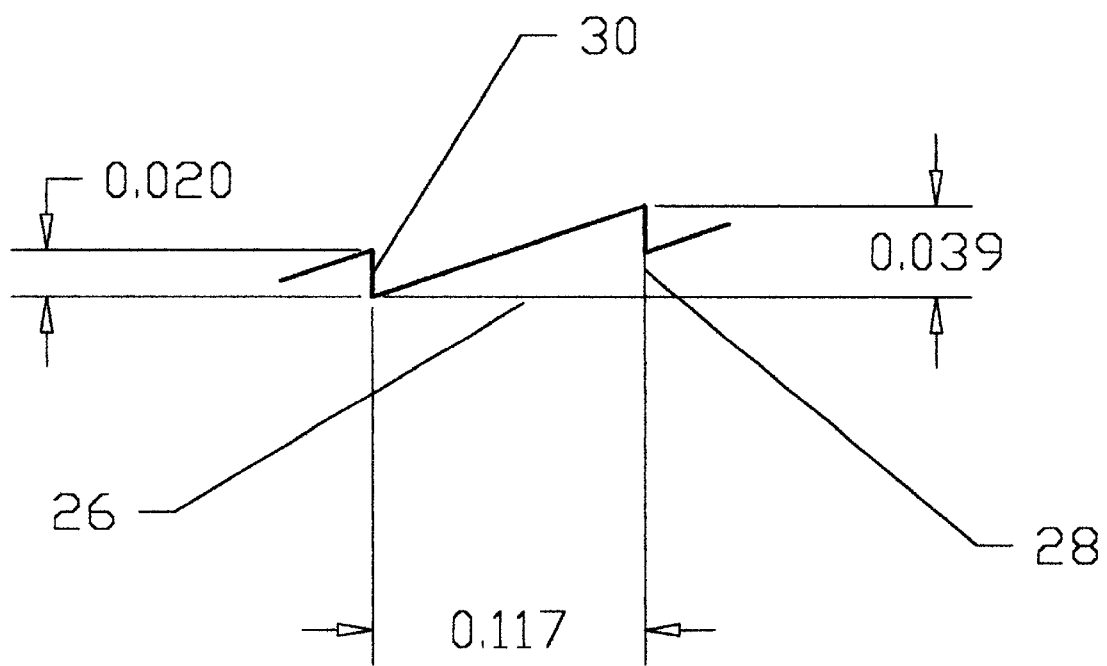
FIG. 2B is an enlarged view of one portion of FIG. 2 illustrating one ramp of the grooved ridges of the uncoupling retard means of the invention.

Referring now to FIG. 2B there is shown an enlarged view of one of the steps showing that the longitudinal inclined slopes 22 have a x-component 26 of run or length of inclined slope 22 of 0.117 inches, a final y-component 28 of radial depth of vertical step 24 of 0.039 inches, and a midway radial depth 30 of sloping run 22 of 0.020 inches. Please note the longitudinal length of sloped surface 22's x-component 26 is 0.117 inches. The actual length of the longitudinal slope 22 then being somewhat larger than 0.117 inches.

Figure 3:
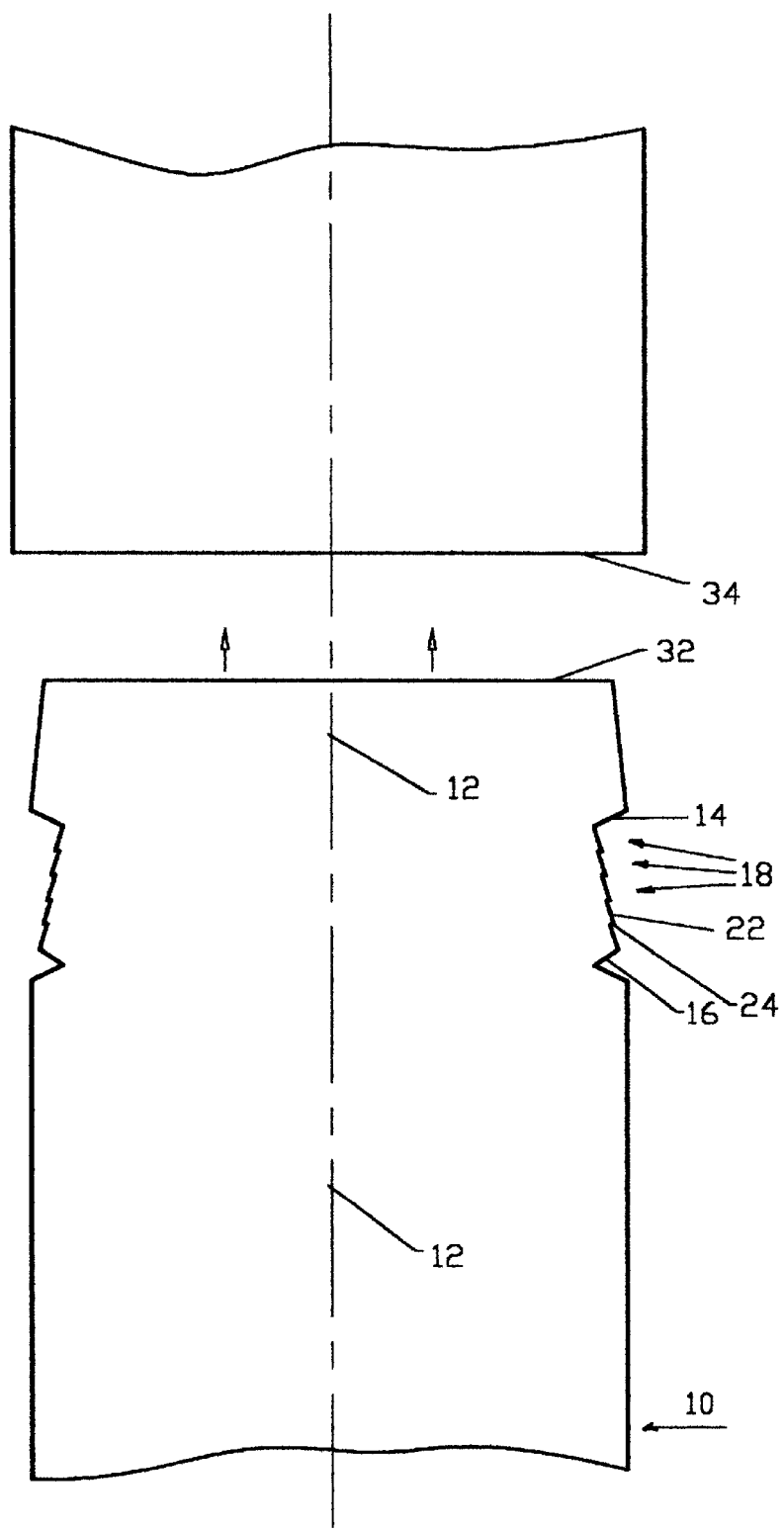
FIG. 3 is a schematic cross-sectional view of the tube wall of the coupling end of a duct fitting constructed according to the teachings of the invention for inserting within a standard tube/pipe/duct longitudinal run.

Referring now to FIG. 3 there is shown a schematic cross-sectional view of the tube wall of the coupling end of a duct fitting constructed according to the teachings of the invention for sliding within/inserting within the open end of a standard tube/pipe/duct longitudinal run. This embodiment of the invention comprises grooves 14, 16, 18 (initial or starting groove 14 and final terminal groove 16, a series of longitudinal grooved steps 18 having increasing radial distance from the axis 12 of connector 10 including sloped portions 22 and vertical step portions 24) disposed on the tube wall near the end of the fitting 10 such that when the end 32 of the fitting is slid/inserted within a the end of a longitudinal duct run 34 as illustrated with FIG. 3, a flexible annular deformable gasket material such as an O-ring will deform between the tube walls of the duct fitting and the duct run.

Figure 4:
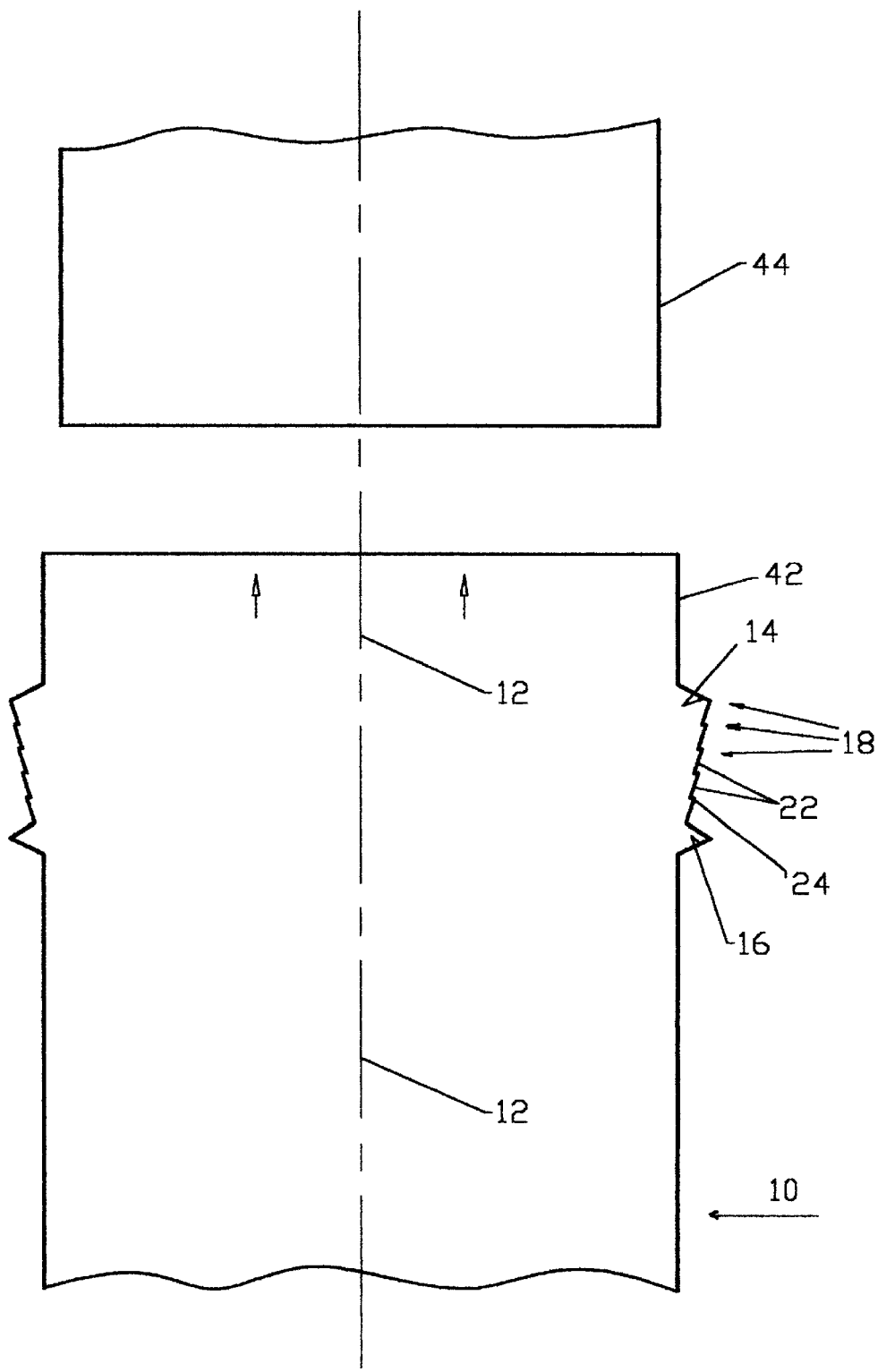
FIG. 4 is a schematic cross-sectional view of the tube wall of the coupling end of a duct run constructed according to the teachings of the invention for sliding over a standard tube/pipe/duct fitting.

Referring now to FIG. 4 there is shown a schematic cross-sectional view of the tube wall of the coupling end of a duct run 42 constructed according to the teachings of the invention for sliding over a standard tube/pipe/duct fitting 44. This alternate embodiment of the invention comprises groves (initial or starting groove 14 and final terminal groove 16, a series of longitudinal grooved steps 18 having increasing radial distance from the axis 12 of duct run connector 42 including sloped portions 22 and vertical step portions 24) having the mirror image geometry of the fitting groves( see FIGS. 2 and 3) but are now disposed on the tube wall of the end of a longitudinal duct run 42 such that when the end of the duct run 42 is pushed over a standard non-grooved duct fitting 44 a flexible annular deformable gasket material such as an O-ring will deform between the tube walls of the duct fitting and the duct run.

Referring again now to FIG. 2A there is shown a typical O-ring 52 as it is being squeezed between a fitting and a duct run during assembly of same. Please note that O-ring 52 is sized to completely envelope two groves 18. This provides assembly stability such that during the assembly of a fitting within a duct run, even if the fitting is only partially inserted, the invention will retard the reverse disassembly movement.

When assembly is completed, of course then O-ring 32 resides within final terminal groove 16 and again will retard and even prevent the reverse disassembly movement.

Figure 5:
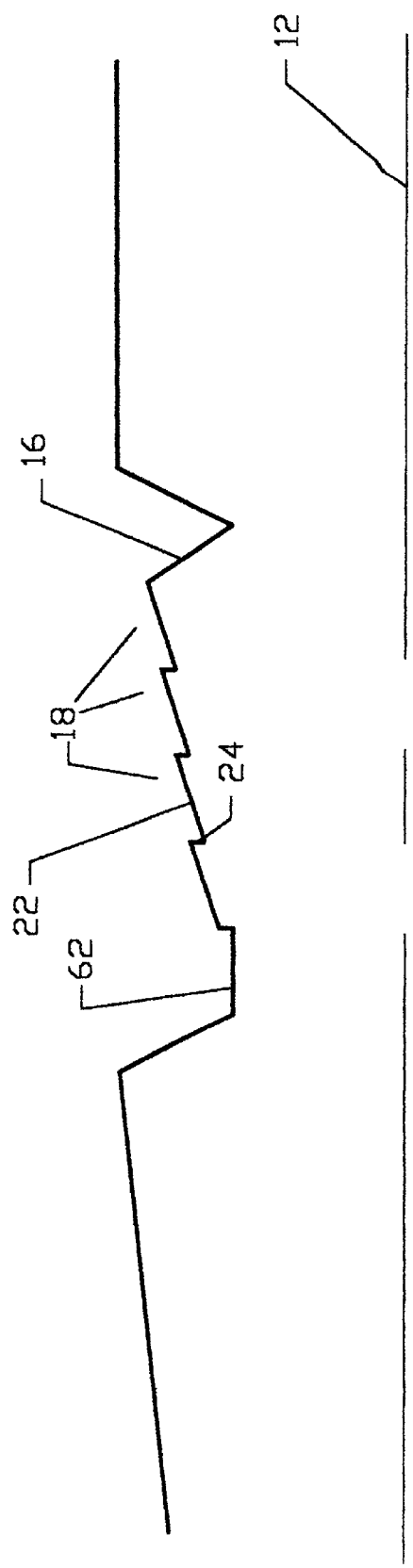
FIG. 5 is a schematic cross-sectional view of one side of the tube wall of an alternate embodiment of the tube/pipe/duct fitting of FIG. 1 illustrating a rectangular groove disposed as the first groove of the series of anti-roll-back grooves constructed according to the teachings of the invention.

Referring now to FIG. 5, there is shown a schematic cross-sectional view of one side of the tube wall of an alternate embodiment of the tube/pipe/duct fitting of FIG. 1 illustrating a rectangular groove 62 disposed as the first groove of the series of anti-roll-back grooves 18 constructed according to the teachings of the invention. Rectangular groove 62 acts as a small barrier for the first groove of the series and thereby provides that a flexible annular deformable gasket material such as an O-ring will start uniformly up the series of grooves 18 and thereby uniformly deform between the tube walls of the duct fitting and the duct run and not get stretched or hung up as it progresses uniformly up the series of grooves 18.

Figure 6:
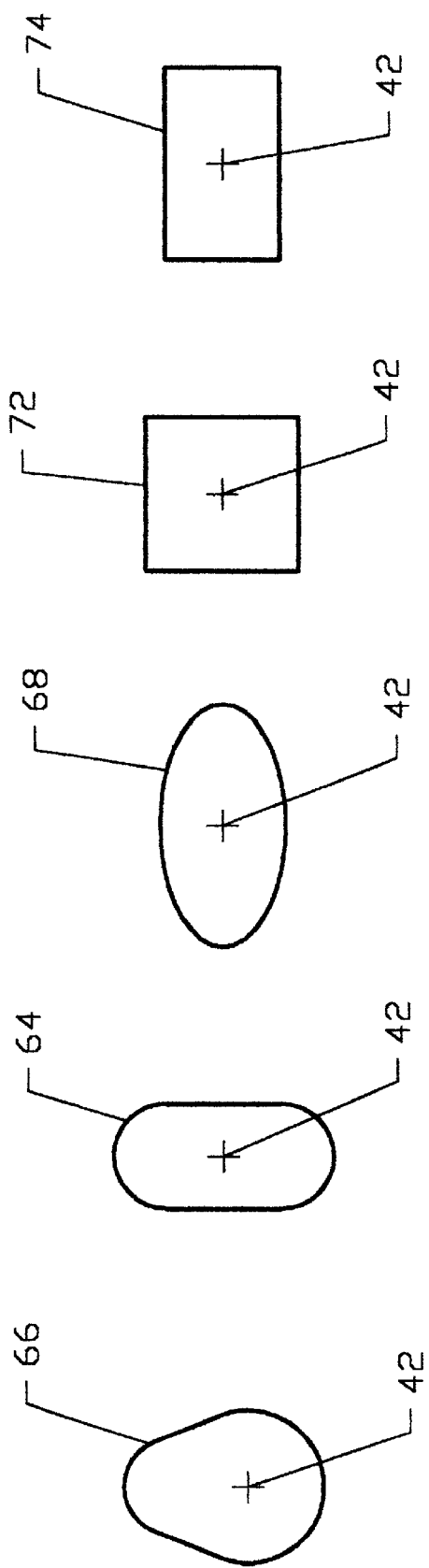
FIG. 6 are alternate o-ring geometries including oblong, egg-shaped, elliptical, square and rectangular cross-sections.

Referring now to FIG. 6 there are shown optional oblong 64, egg-shaped 66, elliptical 68, and even square 72 and rectangular 74 cross-sectioned O-rings for use as flexible annular deformable gasket materials. O-ring shaped retaining means shown in general at (+86) are for ensuring that the O-rings remain disposed between the fitting and the end of the duct run include embedding a wire, band or other form retaining substance within the cross-section of the O-ring. This shaped retaining means 86 and disposing adhesive material on the grooved surfaces of the fitting and the tube wall of the longitudinal duct run groove geometries all enhance the teachings of the invention, but are not necessary to practice the invention. Likewise, although air duct fittings and duct runs have been shown in the preferred embodiments because the invention was developed with reference to HVAC duct systems, it should be recognized that the invention is not limited to such systems, but rather is applicable to any tube of pipe connector.

I claim:

1. A connector coupling for a fluid pipe having an axis and an uncoupling retarding means, comprising a tubular coupling having a radial diameter sized to fit snugly within a longitudinal run of fluid pipe including a first or starting radial depression and a second or final resting depression and a predetermined series of longitudinal-sloped and stepped surfaces disposed there between, said stepped surfaces having increasingly radial steps from the axis of said connector coupling extending from said first or starting radial depression to said second or final resting depression.

2. Fluid connection of claim 1 further including a flexible O-ring made of a deformable material disposed on said first or starting radial depression such that as a conductor is inserted into a longitudinal pipe run, the O-ring rolls, due to the frictional gripping of both the conductor and the longitudinal pipe run pipe walls, up the multiple stepped incline to the second or final resting depression, said multiple incline steps having smooth longitudinal ramps of ever increasing radial distances from the axis of the connector coupling and vertical notch backs extending to the beginning of the next longitudinal ramp so as to prevent vertical anti-roll stopping positions so as to compress and force the O-ring from the axis of the connector coupling to promote movement in the insertion direction and prevent or retard movement in the withdrawal direction.

3. The fluid connector of claim 2 wherein grooves having the mirror image geometry of the fitting grooves described in claim 1 are disposed on the tube wall of the end of a longitudinal duct run such that when the end of the duct run is pushed over a standard non-grooved duct fitting a flexible annular deformable gasket material such as an O-ring will deform between the tube walls of the duct fitting and the duct run.

4. The fluid connector of claim 3 wherein the O-ring described in claim 2 has embedded in it a form retaining means including a semi-rigid material having the cross sectional shape selected from the group of a wire or band.

5. The fluid connector of claim 4 wherein the O-ring described in claim 2 has the cross sectional shape selected from the group of oblong, egg-shaped, elliptical, and even square and rectangular cross-sections.

6. The fluid connector of claim 3 further including a rectangular first or starting radial depression to provide for a flexible annular deformable gasket material such as an O-ring will start uniformly up the series of grooves and thereby uniformly deform between the tube walls of the duct fitting and the duct run and not get stretched or hung up as it progresses uniformly up the series of grooves.

7. The fluid connector of claim 1 further including a rectangular first or starting radial depression to provide for a flexible annular deformable gasket material such as an O-ring will start uniformly up the series of grooves and thereby uniformly deform between the tube walls of the duct fitting and the duct run and not get stretched or hung up as it progresses uniformly up the series of grooves.

* * * * *